United States Patent [19]

Cardinali

[11] Patent Number: 5,081,816
[45] Date of Patent: Jan. 21, 1992

[54] APPARATUS FOR RECEIVING BLISTER PACKS FROM A PRODUCT PACKAGING LINE AND FOR INSERTING THESE BLISTER PACKS INTO CARTONS

[75] Inventor: Paolo Cardinali, Conselice, Italy

[73] Assignee: I.M.A. Industria Macchine Automatiche S.p.A., Ozzano Emilia, Italy

[21] Appl. No.: 708,910

[22] Filed: May 31, 1991

[30] Foreign Application Priority Data

Jun. 7, 1990 [IT] Italy .................................. 3546 A/90

[51] Int. Cl.⁵ ........................ B65B 57/10; B65B 11/52
[52] U.S. Cl. ........................................ 53/54; 53/157; 53/252; 53/541; 53/559; 53/566
[58] Field of Search .................... 53/54, 494, 493, 559, 53/560, 453, 454, 475, 474, 447, 566, 564, 252, 251, 250, 249, 157, 155, 541

[56] References Cited

U.S. PATENT DOCUMENTS

| | | | |
|---|---|---|---|
| 4,506,495 | 3/1985 | Romagnoli | 53/559 |
| 4,517,791 | 5/1985 | Focke | 53/566 |
| 4,614,073 | 9/1986 | Argazzi | 53/54 |
| 4,726,173 | 2/1988 | Giatti | 53/559 |
| 4,845,921 | 7/1989 | Miselli | 53/559 X |
| 5,005,338 | 4/1991 | Kemkers et al. | 53/54 X |

Primary Examiner—James F. Coan
Attorney, Agent, or Firm—Darby & Darby

[57] ABSTRACT

An apparatus, located downstream of a packaging line for packaging of blister packs, works in conjunction with a carton ready-making line and comprises three devices positioned along a conveyor having an upper surface fitted with crosspieces to delimit seats designed to receive said blister packs. The first device transfers the blister packs from the packaging line to the seats, keeping the blister packs with the blisters turned upwards, while the second device, positioned downstream of a station, fills empty seats, where faulty blister packs where placed and from where the faulty blister packs where removed, with non-defective blister packs, the second device feeding itself with non-defective blister packs taken from the seats. The third device forms stacks of blister packs, folds an information leaflet, and inserts the stacks, together with the leaflet, into cartons coming from the carton ready making line.

24 Claims, 13 Drawing Sheets

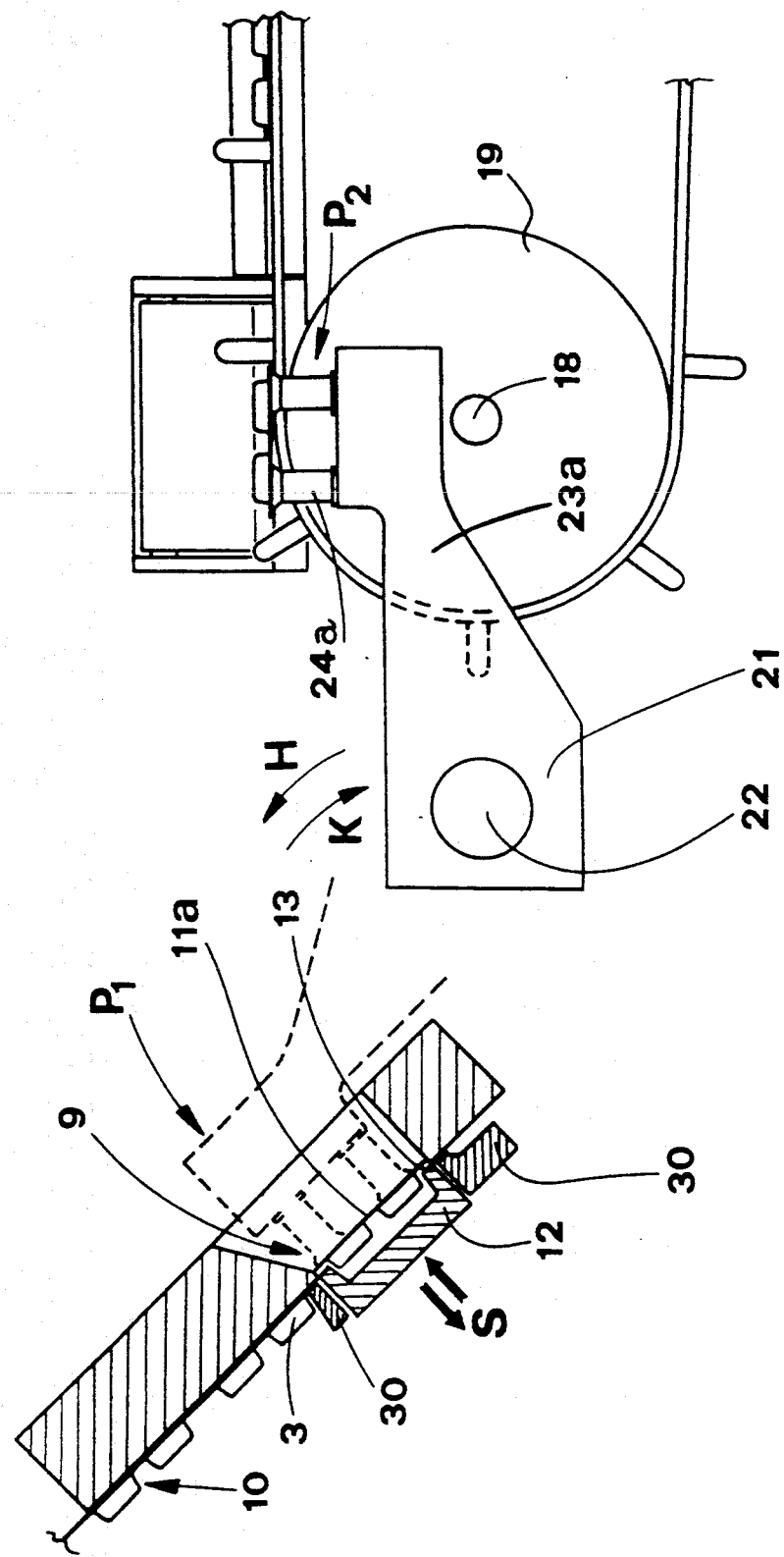

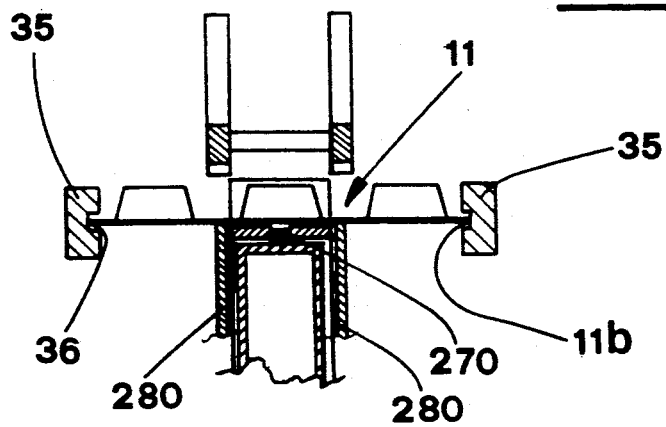
FIG. 10
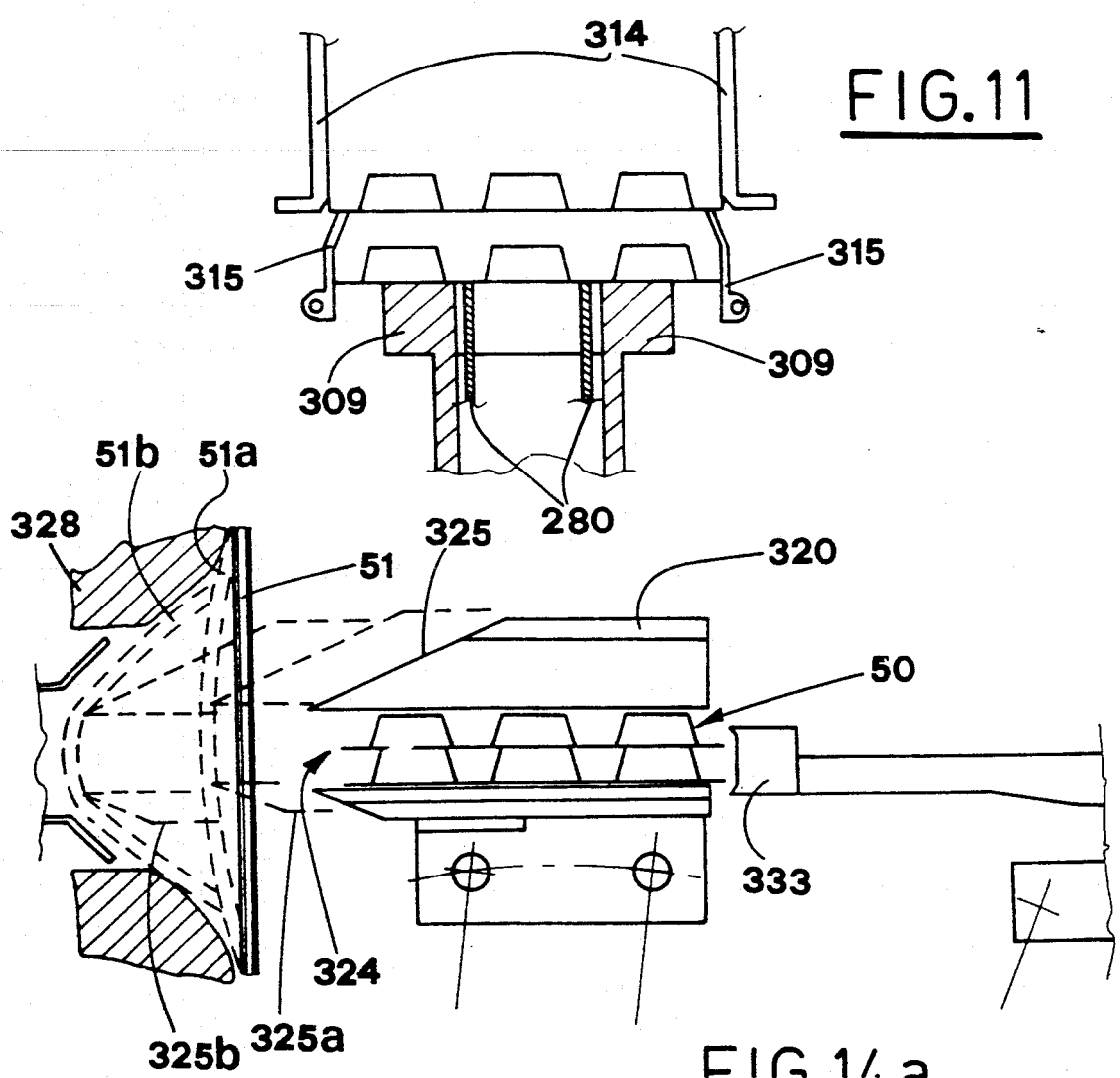
FIG. 11
FIG. 14a

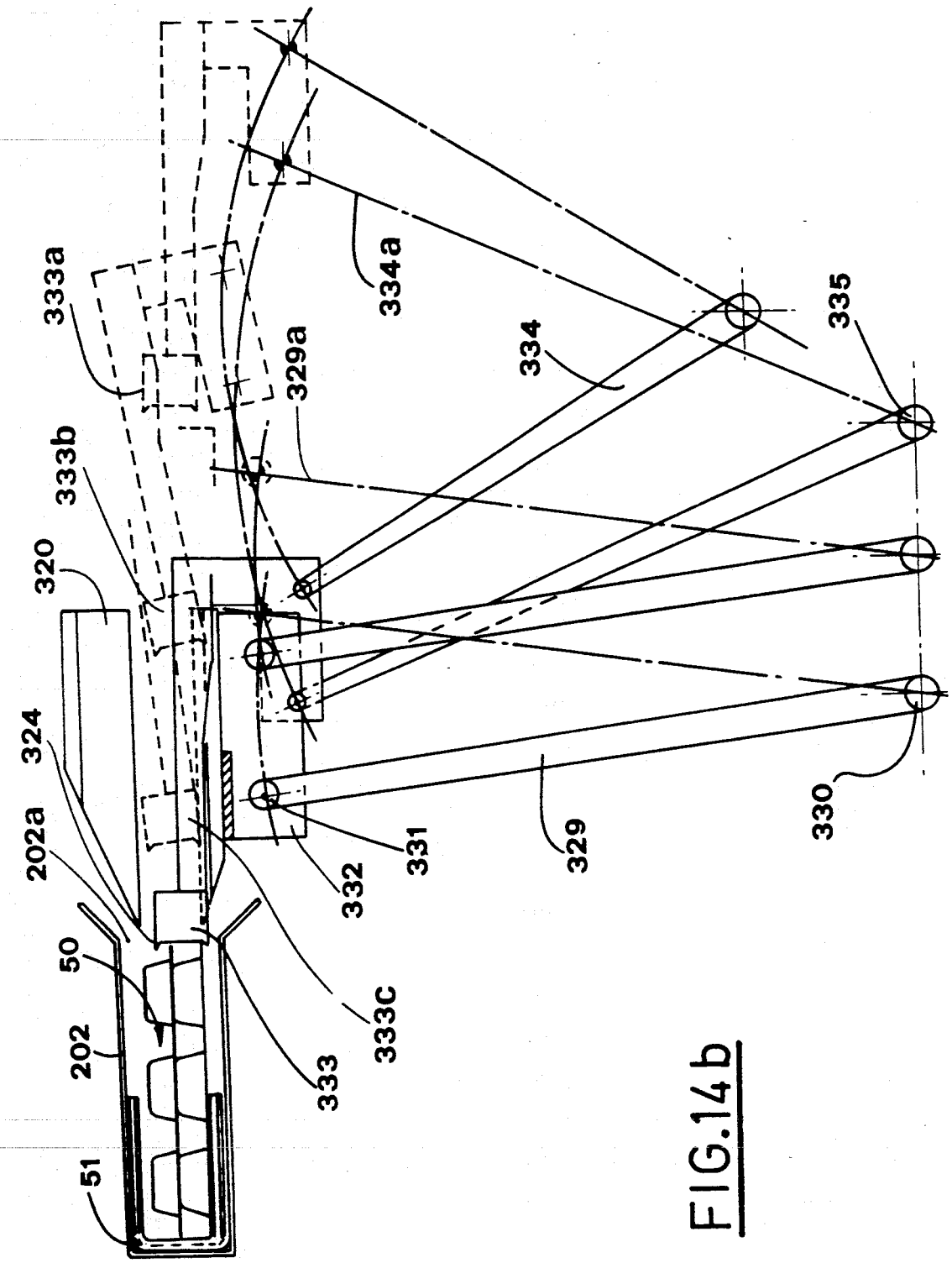

APPARATUS FOR RECEIVING BLISTER PACKS FROM A PRODUCT PACKAGING LINE AND FOR INSERTING THESE BLISTER PACKS INTO CARTONS

BACKGROUND OF THE INVENTION

This invention concerns an apparatus placed and working between a first packaging line for packaging various articles in strips of blistered tape commonly known as blister packs, and a second line where cartons are made, e.g. cases or boxes.

These blister packs are packaged, disposed in a stack, into the cartons together with an information leaflet.

DESCRIPTION OF THE PRIOR ART

Packaging lines, commonly used for packaging various articles in strips of blistered tape commonly known as blister packs, are of the type which, observed from upstream to downstream, comprises a station where the blisters are formed out of thermoformable material, a station where the blisters are filled with a product (e.g.: capsules, tablets, pills and similar objects), a station where the presence of the product in the blisters is detected and/or where it is verified that the product placed in the blisters is not defective, a station where a film of aluminium foil is applied to seal the surface of the said tape where the blisters have their openings, and a station where the tape with the sealed blisters is cut up into blister packs.

A carton ready-making line, working in conjunction with the packaging line, can be commonly set according to two different versions.

The suitable version is chosen according to the kind of blanks from which the cartons must be obtained.

The blanks are usually fed to this line either in a tubular and flattened shape or open and in a flat shape.

In the first case, i.e. when the blanks are supplied to the carton ready-making line in a tubular and flattened shape, this line comprises means fo opening a blank withdrawn from a magazine so as to obtain a carton open at its ends.

These means are actuated while the blank is being transferred by a pickup unit to an infeed station, where the carton obtained in the meanwhile is then placed on a first step-operated conveyor, that brings the cartons along a trajectory parallel to the packaging line.

The conveyor is equipped with two belts positioned side by side and fitted with crosspieces.

A seat for a carton is delimited by each couple of consecutive crosspieces.

A pusher is actuated at the infeed station synchronously with the pickup unit, so as to act on the just formed carton in order to keep the carton on the conveyor during an initial forward motion.

In particular the pusher acts on a side of the carton, just over a crosspiece against which this side of the carton is resting.

The conveyor also includes suction means which act on the cartons through holes made in the belt, between each copuple of crosspieces.

The cartons are this way held on the conveyor during an initial forward motion, by the action of the suction means.

The carton ready-making line includes another conveyor longitudinally aligned above the first conveyor.

This second conveyor also consists of a belt fitted with regularly spaced crosspieces so that to work together with the first conveyor.

The second conveyor also has holes adjacent to the crosspieces, through which the lower part of the belt communicates with the suction means.

The carton is unable to move out of the correct transporting position and maintains its exact open shape, that is to say with right angles, since the pusher moves forward to guide the carton up to the infeed area between the counter-rotating conveyors.

The upper and lower walls of the cartons are firmly held by the corresponding parts of the upper and lower conveyor respectively, as a consequence of the action of the suction means.

Also the elastic action of the belts on the upper and lower walls makes the cartons to maintain their exact open shape, with right angles, no matter of their size and even with high operation speed.

The first and second conveyors are step-operated, so as to allow the insertion of a stack of blister packs into a respective carton, together with an information leaflet, actuated at a preset station.

The insertion of the blisters and leaflet into the cartons is made easier by keeping each carton in the correct shape and position.

In the second case, i.e. when the blanks are supplied unfolded and flat to the carton ready-making line, this line includes two apparatuses placed one following the other one.

The first apparatus has the task of feeding single blanks. The blanks, stacked and resting on one of their sides, are kept in a magazine shaped like a sloping channel.

Downstream of this channel there is a device able to divide the stack of blanks in smaller stacks, in accordance with the receiving of control signals.

Following the divider device there are first and second means made up of a pair of flat panels, inclined and facing each other. The first and second means are located one just after the other so as to continue on the channel transport plane.

Lastly, there are reciprocating means fitted with vacuum cups for picking up the blanks and feed them, one by one, to the second apparatus.

The second apparatus includes a toothed conveyor belt, wound in a closed loop on two corresponding toothed wheel, one of which is made to intermittentely rotate.

The belt is fitted with vacuum cups and extends along a vacuum channel so that the blanks are brought, in sequence, through a series of operating stations, respectively equipped with checking means and folding means for obtaining a carton from each blank, with or without a closed end.

The blanks can be shaped so as to obtain a case or box with a hinged lid.

To achieve a high operation speed in feeding devices, or a section of packaging machines, by which a stack of blister packs is made and then inserted in the cartons made by the second line, it is necessary to solve a large number of problems, also because together with the blister packs a leaflet must be inserted into the cartons.

The problems are more and more if other facts are considered, that is to say, the necessity of changing the size of the blister packs, of changing the number of blister packs for each carton, the necessity of changing the size of the cartons and the kind of leaflet.

According to a known device, the strip of blistered tape, from which the blister packs are obtained, is fed horizontally (with the blisters turned downwards) into the cutting station.

Here the cutter moves upwards and the blister pack formed by the cutting action is transferred upwards by an elevator which is coaxially inserted in the cutter and driven in synchrony with it.

The blister pack raised in this way goes to touch and pushes aside spring-loaded retainer fittings, designed to support the blister pack, or the blister packs, once the elevator has been lowered.

A stack of blister packs will gradually be formed on these fittings and once completed the stack is then conveyed to one side by a pusher and passed to a stack infeed conveyor that brings the stack to a carton.

However, this version does present some manufacturing complications in that it is not possible for any individual blister packs that are faulty to be rejected; any faulty blister packs will either have to be rejected with the entire newly-formed stack, or with the carton containing the stack.

It should also be pointed out that the stack is formed with the blisters turned downwards; this means that the weight of the whole stack is resting on the blisters of the bottom blister pack, which obviously will not make the stack very stable.

Another known machine, provides for the blister strip being fed horizontally to the cutting station (with the blisters turned downwards) but the cutter moving downwards; this means that blister packs made in this way will drop onto the blister pack infeed conveyor positioned below the cutting station and then they will be fed to the parts forming the stack.

These blister packs are positioned onto the infeed conveyor with the blisters turned downwards, which means they cannot be inspected (inspection may be requested and/or carried out during packaging).

Furthermore, the blister-packs are not perfectly centered as they are positioned on the infeed conveyor (i.e. they are not symmetrical to the longitudinal axis of the conveyor); this is because the blister packs are transferred from the cutting station and dropped directly onto the conveyor without further control or means of guidance.

This conveyor is also the place where any faulty blister packs will be rejected by ejection equipment which acts onto the faulty blister packs by lateral force as they progress along the infeed conveyor, thus removing any faulty packs from the conveyor.

Obviously, this will not be facilitated by the fact that the blister packs are supported by the ʋlisters, as has already been mentioned.

These factors will obviously limit the running speed of the conveyor.

In yet another known device the blister strip is fed vertically into the cutting station and the cutters operate parallel to the direction the blister packs are being pulled along the conveyor in.

Above the conveyor there is an arm, whose one end is fitted with pressure suction cups; this end of the arm pivots vertically and diagonally in relation to said direction, and for a short distance it advances parallel to the latter direction.

In one of the extreme positions the suction cups are positioned in the cutting station where they pick up the flat surface of the newly-formed blister pack.

The arm is then conveyed lengthways downstream and then rotated downwards so that the suction cups are positioned above the conveyor, where the blister packs are placed with the blisters turned downwards; by disenabling the suction cups, transfer of the blister pack is complete, and the pack will consequently remain on the conveyor with the blister turned downwards.

The version that has just been described presents the same complications as the previous one; furthermore the inertia of the diagonal and pivoting arms obviously limits the running speed of blister pack transfer operations.

If the blister packs were placed on the conveyor with the blister turned upwards, some of these difficulties would be overcome; this would also allow inspection of the blisters and would not prevent the ejection of any faulty blister packs.

In one of the known versions this is obtained through a design feature, which, however complicates the procedure and makes the packaging machine larger.

In this version the blister strip is made to rotate on rollers at an angle of 180 degrees from the sealing station to the cutting station, so that the blister strip is fed horizontally, with the blister turned upwards to the cutting station; in the cutting station the cutter moves downwards.

It is well-known that defective blister packs have to be rejected. This can be done, as already stated above, by applying a lateral force to the defective blister packs inserted into the seats of the conveyor, in a transverse direction with respect to the direction of movement of the conveyor, so as to eject them from the seats.

To optimise performance of the device designed to form the stacks of blister packs, which is at the end of the conveyor, the missing blister packs in the vacant seats (from which the defective blister packs have been discarded) must be replaced by other, non-defective ones.

This is done at present by providing the conveyor with a magazine containing non-defective blister packs, upstream of the device.

Suitable extracting means, if the magazine is situated beside the conveyor, or arms provided with vacuum-operated gripping means (suction cups), if the magazine is situated above the conveyor, collect the blister pack at the bottom of the stack of blister packs contained in the magazine in order to insert the blister pack into an vacant seat.

Where the magazine is situated above the conveyor, insertion of a blister pack into the vacant seat below can take place under the action of gravity, e.g. by opening, by means of a mechanical or electromechanical control, the spring-operated retaining means of the stack of blister packs contained in the magazine.

In known solutions, transfer of the blister packs takes place in one direction only, that is from the magazine towards the seats on the conveyor; consequently there is the problem of feeding the magazine with blister packs.

At present feeding is effected manually by loading the magazine from above.

The magazine is fed with blister packs collected at the beginning of the conveyor for example using the already mentioned technique of ejecting the blister packs from their seats, and then letting them fall, under the action of gravity, into a container placed below, from which they are removed manually, in order to load the magazine, manually, from above.

Obviously the ejection of non-defective blister packs from the upper surface is synchronised to coincide with a momentary interruption during which the cartoning machine does not pick up at least one carton (and corresponding leaflet) which the non-defective blister packs were to have filled.

Apart from having to use manual workers to load the magazine (with attendant costs), this work method is in distinct contrast with the high levels of technology and productivity achieved by blister packing machines, and machines which place such blister packs in cartons.

Automatic devices of different types are known which insert a single blister pack or a stack of blister packs into a corresponding carton.

In one such known device the blister packs are stacked, from below upwards, within a vertical magazine, from which they are removed in batches by means of a pusher pushing crossways with respect to the same magazine. The blister packs are then inserted into a movable drawer, from which they are thereafter removed, again by pushing means for insertion into a carton.

At present devices of this type have many drawbacks, since for example the pusher may move the wrong number of blister packs because the latter may not always be perfectly flat.

Such devices furthermore often do not enable appropriate solutions to be found to the problem of inserting the instruction leaflet, which usually accompanies the blister pack, into the carton together with the blister pack. In fact usually the leaflet is intercepted by the stack of blister packs being pushed out from the drawer and is forced into the carton by the stack.

If the leaflet happens to be relatively thick, the stack of blister packs may become misaligned; or else the stack may not succeed in folding the instruction leaflet, in particular when only one single blister pack is being put into each carton.

SUMMARY OF THE INVENTION

In order to overcome all the problems and drawbacks stated above, the Applicant proposes an apparatus designed to work in conjunction with and between a first packaging line, for packaging various products in blister packs, and a second carton ready-making line, for setting cartons to receive a stack of blister packs; this apparatus must comply with the following provisions:

transferring of a blister pack from a cutting station to seats provided on a conveyor, must be performed in such a way that the blister packs placed in the seats have the blisters turned downwards and are perfectly centered in respect of the conveyor, all this performed without the gripping means leave the blister packs during the transfer from the cutting station to the conveyor seats;

feeding of non-defective blister packs to the empty seats, previously bearing defective blister packs, must be automatically performed after that the defective blister packs have been ejected; the non-defective blister packs are withdrawn from a magazine wich feeds itself, when needed, with non-defective blister packs taken from the same conveyor seats;

forming a stack of non-defective blister packs and inserting the stack, together with an instruction leaflet, into a carton coming from the carton ready-making line, must be performed at high operating speed, no matter of the size of the stack and of the kind of leaflet.

Moreover it is an object of the invention to propose an apparatus that is independent, as for working, of the blister packaging machine and of the carton ready-making machine; however the apparatus proposed is operatively interconnected with the blister packaging machine and with the carton ready-making machine.

Yet another object of the invention is to provide an apparatus that can work in conjunction with any kind of blister packaging machine and of carton ready-making machine, in other words, that is universal.

The above-mentioned objects and aims are reached, in accordance with what is stated in the claims, by means of an apparatus for receiving blister packs from a product packaging line, and for inserting said blister packs into cartons coming from a carton ready-making line operating to obtain cartons from flat blanks or from flat tubular blanks.

The apparatus comprises:

a conveyor made as a closed loop and located downstream of a cutting station where said blister packs are formed in said packaging line, said conveyor being connected with its terminal part to said carton ready-making line for obtaining said cartons and featuring an upper surface fitted with crosspieces forming seats therebetween designed to receive blister packs oriented transversely in respect of said conveyor;

guiding means located at both sides of said conveyor and designed to engage longitudinal edges of said blister packs placed in said seats so that said edges can slide along said guiding means and that said blister packs are centered in respect of said upper surface;

a first device located and operating between said cutting station and the beginning of said upper surface, said device being operated in phase correlation with the operation of said cutting station, and with the motion of said conveyor, so to transfer said blister packs from said cutting station to relative receiving seats of said upper surface which are passing step by step at said beginning of said conveyor, with said blister packs resulting placed into said seats with the blisters turned upwards and with the related longitudinal edges engaging said guiding means;

an ejecting station for ejecting faulty blister packs out from the related seats, said ejecting station being located downstream of said first device;

a second device, positioned downstream of said ejecting station, said second device operating in phase correlation with the motion of said conveyor and being designed to fill empty seats of said upper surface with non-defective blister packs, when said faulty blister packs are removed from said seats, said second device being also able to feed itself, in occasion of a stop of said carton ready-making line in forming at least one carton, with said non-defective blister packs taken from said seats of said upper surface;

a third device, positioned downstream of said second device near the terminal part of said upper surface, said third device being operated, in phase correlation with the motion of said conveyor and of said carton ready-making line, so as to form stacks of non-defective blister packs, to fold an iformation leaflet, to move a stack, together with a folded leaflet, perpendicularly in respect of said upper surface, to insert said stack and leaflet into a carton positioned on said carton ready-making line.

BRIEF DESCRIPTION OF THE DRAWINGS

The characteristics of the invention are set out below, with particular reference to the attached drawings, in which:

FIG. 4 is an enlarged side view of a particular of FIG. 2a marked as 110;

FIG. 10 is a cross section of the part shown in FIG. 9, cut along the line X—X;

FIG. 11 is a cross section of the part shown in FIG. 9, cut along, the line XI—XI;

FIGS. 14a and 14b are cross sections of the part of FIG. 9, cut along the line XIV—XIV, respectively shown in two subsequent operating stages for the insertion of a blister pack stack into a carton.

DESCRIPTION OF THE PREFERRED EMBODIMENT

Figure 1:
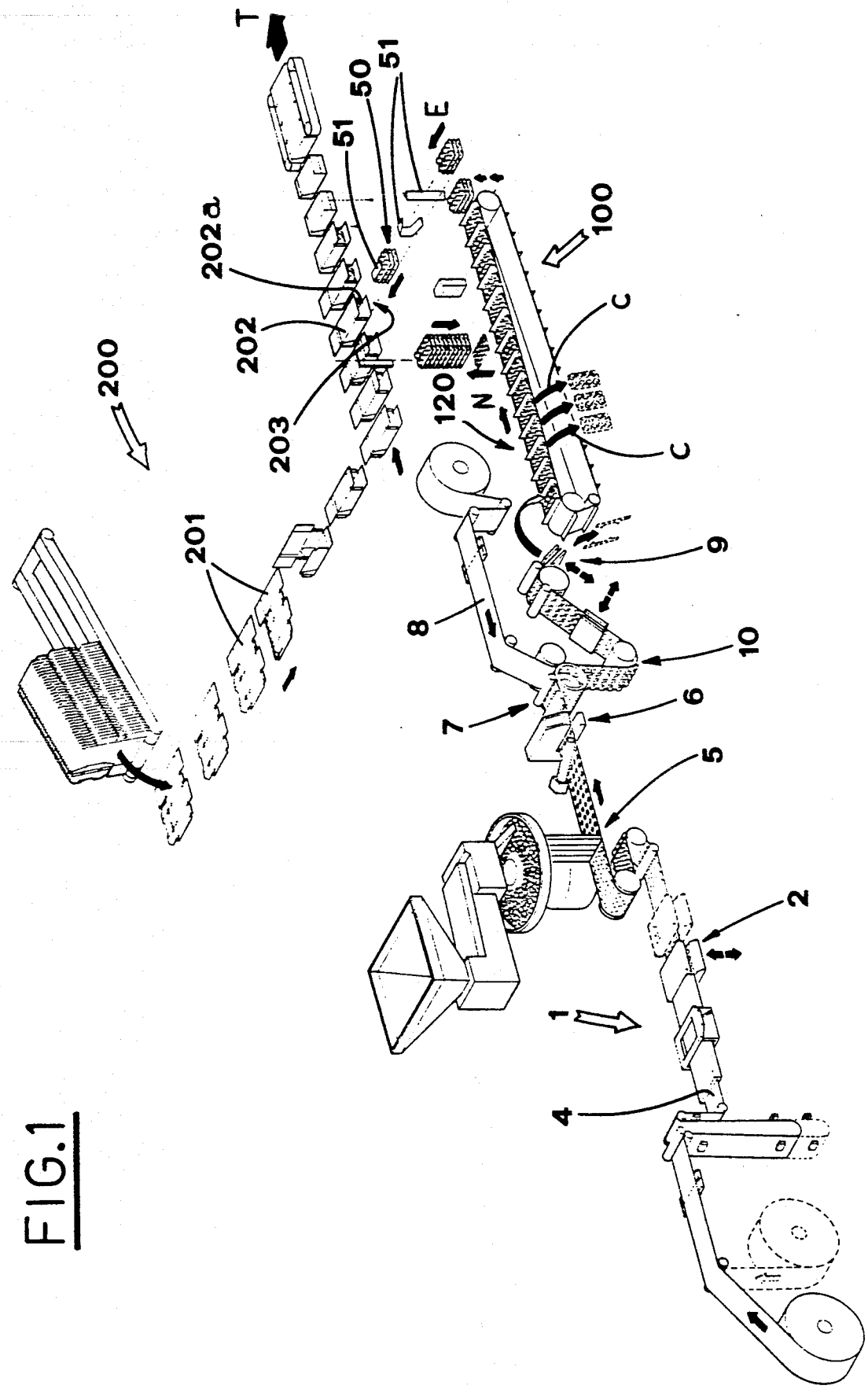
FIG. 1 is a perspective schematic view of the operating stages of the apparatus, in which the main operations of the apparatus are shown together with the main operations of a blister packaging machine and of carton ready-making machine, connected to the apparatus, the cartons being obtained from flat blanks.
Figure 2:
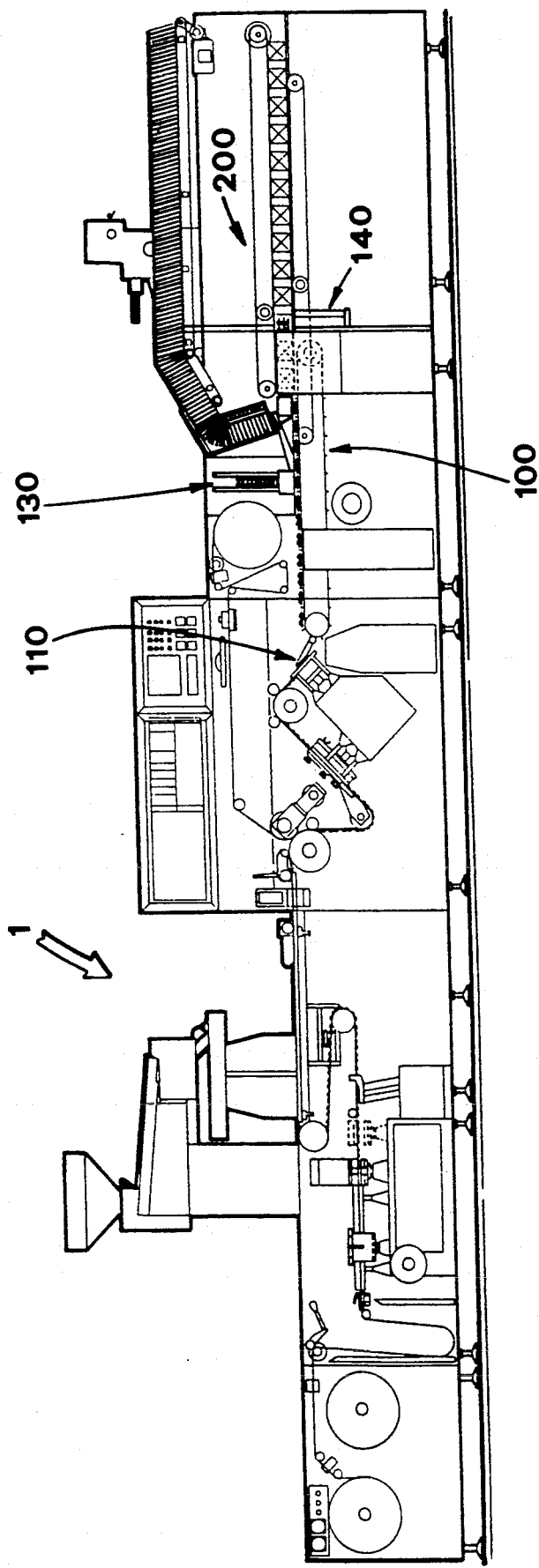
FIG. 2 is a side view of the apparatus.
Figure 2A:
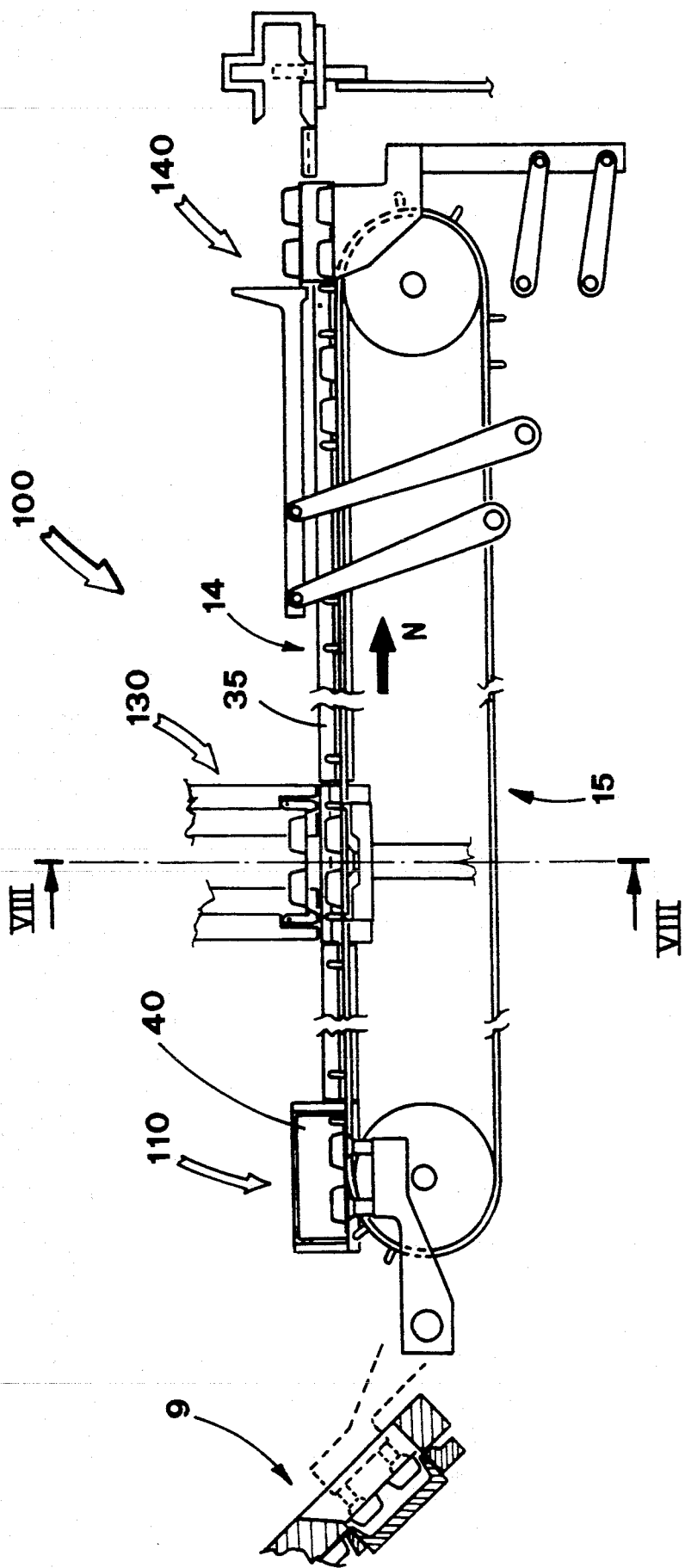
FIG. 2a is an enlarged view of a particular of FIG. 2 marked as 100.
Figure 3:
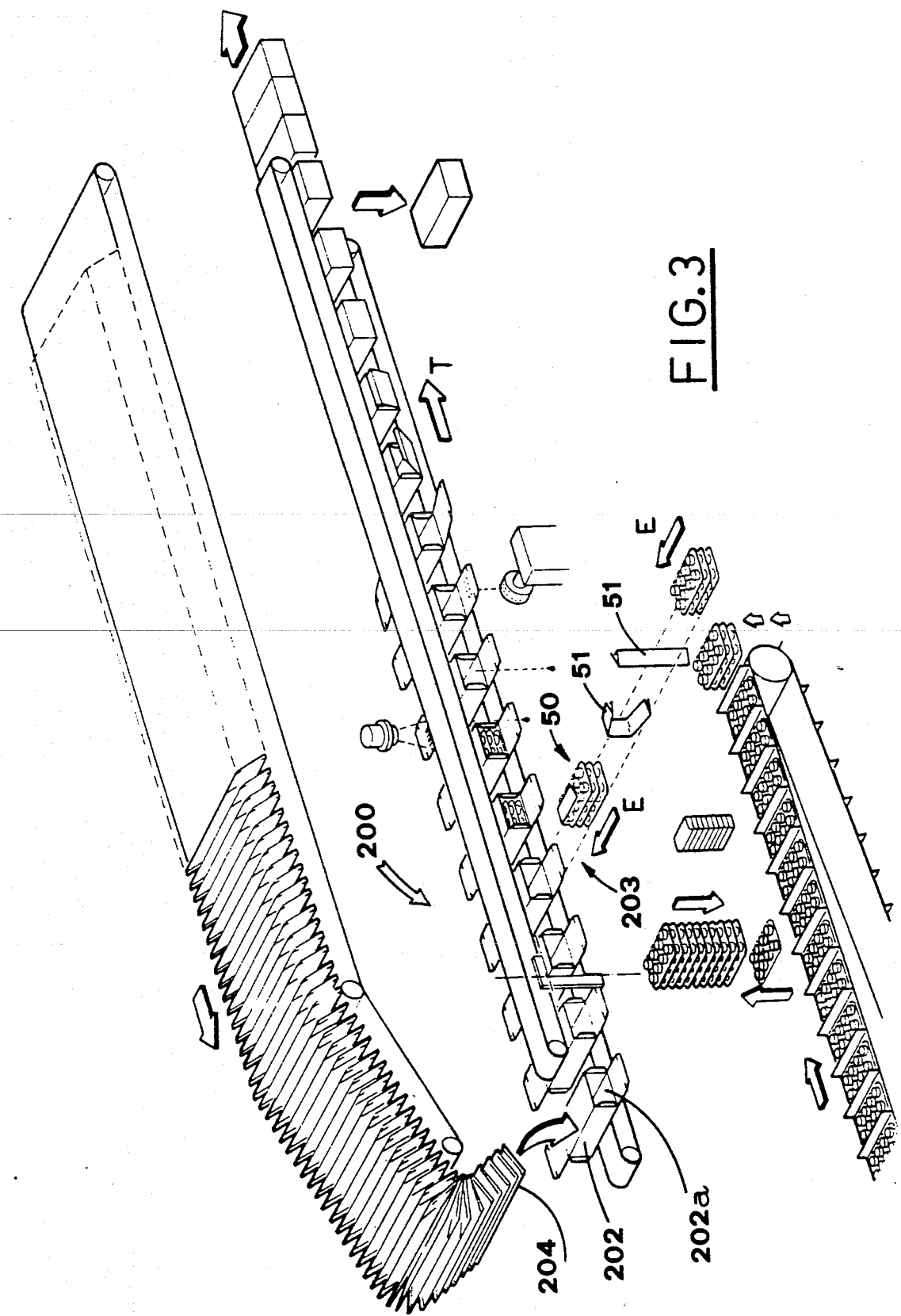
FIG. 3 is a perspective schematic view of the operating stages of the apparatus, in which some of the main operations of the apparatus are shown together with the main operations of a carton ready-making machine, connected to the apparatus, the cartons being obtained from tubular flat blanks.

With reference to FIGS. 1, 2 and 3, the reference number 1 indicates a first packaging line, for packaging various products (such as tablets, pills, and so on) into blister packs.

Reference number 100 indicates the p.~posed apparatus, while reference number 200 indicates a second line for ready-making of cartons, e.g. cases or boxes.

This carton ready-making line can be set according to two versions.

In the first version, schematically shown in FIG. 1, this machine operates on flat blanks 201 to obtain cartons 202, with at least one open end 202a.

The way of operating of the machine is not concerned with the invention and therefore not shown, also because it is described in the introductory statement of this specification.

A stack 50 of blister pack 11 is inserted into each carton, through the open end 202a, at a cartoning station 203. Together with the stack of blister packs there is an information leaflet 51, also inserted in the carton.

The way of inserting the blister packs in the carton is better described in the following.

In the second version (shown in FIG. 3) the machine operates on flat tubular blanks 204 to obtain cartons 202 with at least one open end 202a.

The way of obtaining the cartons 202 from the blanks 204, is the subject matter of the IT-3542A/90, filed by the Applicant on June 7th, 1990.

Also in this case a stack 50 of blister pack 11, together with an information leaflet 51, is inserted into each carton 202 at a cartoning station 203.

In both versions of the carton ready-making line 200, the conveyors which carry the cartons are step-operated according to a longitudinal direction referenced to with T.

The stack is moved transversely according to direction E, perpendicular to the direction T.

The packaging line 1 includes, proceeding downstream:

a station 2 for forming blisters 3 on a tape 4 of thermoformable material;

a station 5 for filling the blisters 3 with a product (not shown), for example: tablets, capsules, pills and other similar articles;

a station 6 for detecting the presence of the product in the blisters, or alternatively, for detecting both the presence and the undamaged state of the product placed in the blisters 3;

a station 7 where a sealing foil 8 is applied to the surface of the tape 4 on the side where the blisters are open;

a station 9 where the sealed blister tape is cut into single blister packs 11.

The apparatus 100, that is the subject of this invention, is located just downstream of the cutting station 9.

The apparatus consists of a conveyor 15 following which there are a first device 110, a station 120 for ejecting faulty blister packs, a second device 130 and a third device 140.

The technical solutions connected with the devices cited above, are the subject matters of the IT-3545A/90, IT-3544A/90 and IT3543A/90, filed by the Applicant on June 7th, 1990.

The conveyor 15 consists of two adjacent belts 15a, 15b, each one provided on its outer side with crosspieces, 16a, 176, which protrude right across the adjacent belt so as to cover the entire width of the upper surface 14.

The crosspieces of the two belts 15a, 15b form seats 17 which receive the above-mentioned blister packs 11 (as better described in the following).

At either side of the upper surface 14 of the conveyor 15, there are two fixed sidepieces 35 located symmetrical to the longitudinal axis of the surface 14.

The fixed sidepieces 35 feature on the inside two longitudinal grooves 36 receiving the longitudinal edges 11b (as better described hereinafter) of the blister packs 11 being placed in these seats 17.

Figure 5:
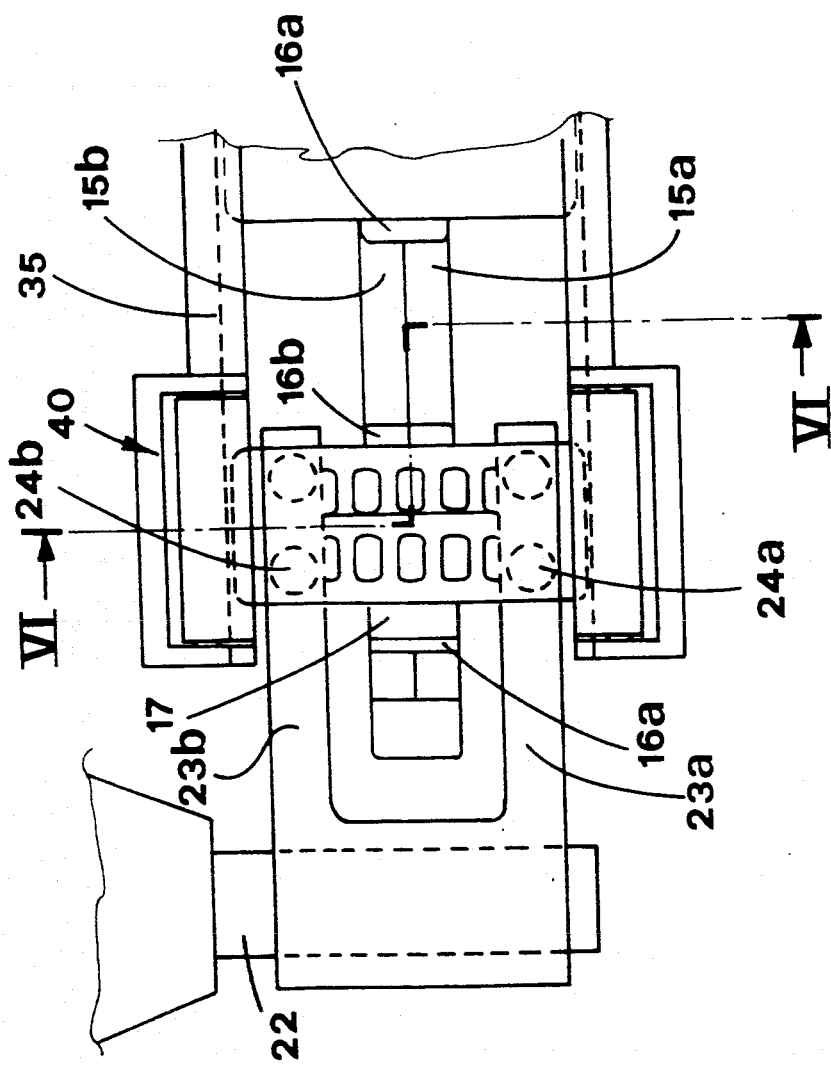
FIG. 5 is a partial top view of the part shown in FIG. 4.
Figure 7:
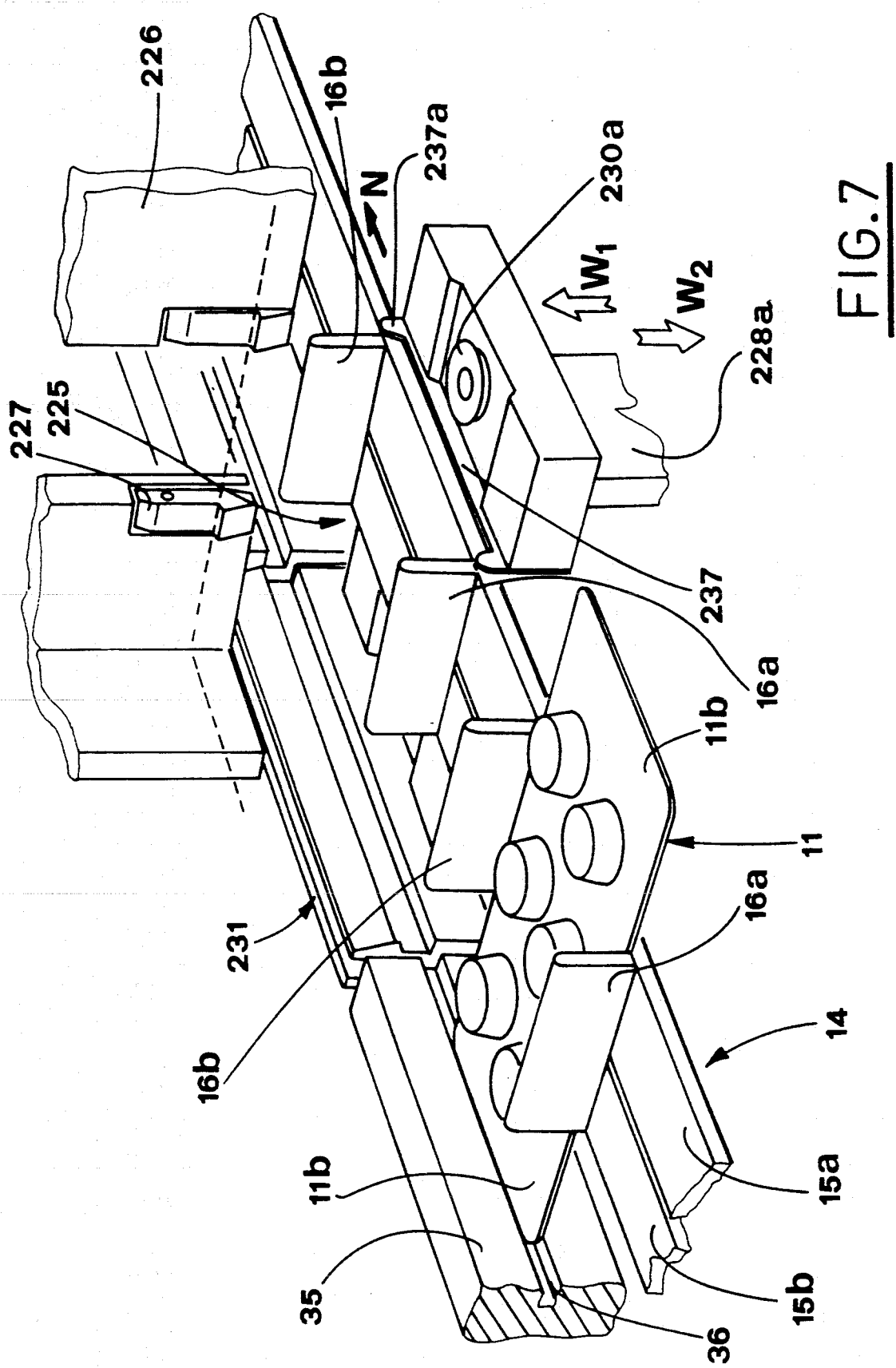
FIG. 7 is a perspective enlarged view of a particular of FIG. 2a marked as 130, with some parts deleted so as to show the most important details of the apparatus.

The fixed sidepieces 35 start at the initial part of the upper surface 14 (see FIGS. 4 and 5) and extend downstream, in respect of the surface proceeding in the direction N.

Figure 6:
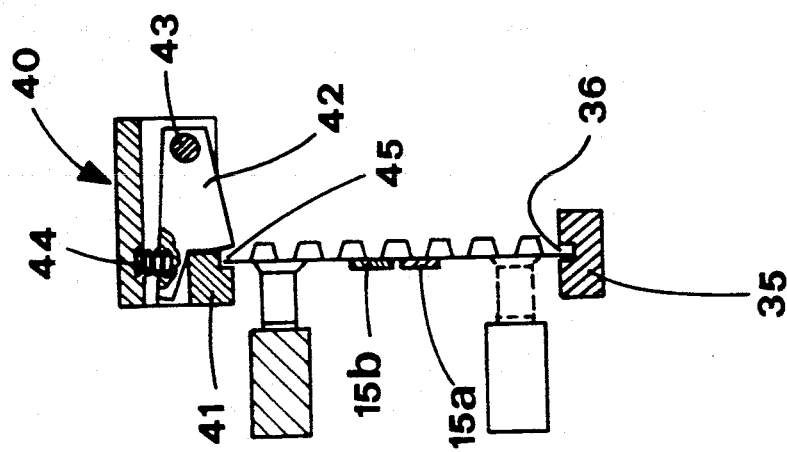
FIG. 6 is a cross section of the part shown in FIG. 5, cut along the line VI—VI.

Immediately upstream from these sidepieces 35 there are two second sidepieces 40 (see FIG. 6) connected to the beginning of the upper surface 14.

Each of these sidepieces 40 is made up of a lower fixed part 41 and an upper mobile part 42, pivoting on a shaft 43 which is parallel to the direction N and which can oscillate against with spring fittings 44.

Both parts 41 and 42 feature a longitudinal slot 45; the longitudinal slots 45 are aligned to the grooves 36 of the fixed sidepieces 35.

The device being now described, indicated by the reference number 110, is located and operates between the cutting station 9 and the beginning of the conveyor upper surface 14.

The cutting station 9 (FIG. 4) is inclined, and slopes downwards upstream to downstream.

The cutting station 9 consists of cutters 12, which are mobile alternately in the direction of S, and in conjunction with the matrix 13, in a way which is known and with mobile parts 30 designed to hold the blister strip 15 against the edge of the matrix 13, which faces the cutters 12.

At this station the blister strip 10 is driven, with the blisters 3 turned downwards, by intermittent motion.

The device 110 consists of an arm 21 pivoting and supported by a shaft 22, positioned between the station 9 and the initial part of the upper surface 14.

The shaft 22 is placed at a lower level in respect of the surface 14, and is parallel to the axis 18 of the wheel 19, which the belts 15a and 15b partly turn around.

The arm 21 consists of two parallel and identical pieces 23a and 23b, positioned in corresponding working spaces respectively at either side of the upper surface 14.

The ends of said pieces are fitted with gripping means, such as suction cups 24a and 24b, which, according to a known way, can be connected to a source of vacuum, which is not shown; the axes of the suction cups are perpendicular in respect of the respective pieces 23a and 23b.

The arm 21 oscillates by the action of known parts (these are not shown since they are not relevant to the invention) in directions H and K.

The length of pieces 23a and 23b and the position of the shaft 22, in relation to the cutting station 9 and the upper surface 14, enable the suction cups 24a and 24b to be positioned at the station 9 (see FIG. 4 for the first position P1).

After that the arm 21 has rotated towards K, the suction cups are positioned at either side of the upper surface 14 (see FIG. 4 for the second position, P2) and between the sidepieces 40.

The blister strip 10, as has been mentioned, is driven by intermittent motion; the arm 21 oscillates in phase correlation with the operation of the cutting station 9.

The suction cups 24a, 24b are moved to the first position P1 when the blister strip 10 is cut by the cutter 12 and the matrix 13.

This cutting action is optimized by stopping the strip 10 against the matrix 13 by the parts 30.

The conveyor belt 15 is driven by intermittent motion in phase correlation with the oscillations of the arm 21.

When the suction cups 24a, 24b are moved to the second position P2, a bucket 17 is made available on the conveyor 15 for receiving a blister pack 11, that is brought by the suction cups between the sidepieces 40.

The working way of the first device 110 is already clear from the above description, and is further explained in the following.

When the suction cups 24a and 24b are in the first position, they are located at the cutting station, directly touching the smooth surface 11a of the blister pack 11 being cut from the blister strip 10.

At this poit the suction cups are actuated so that they pick up the blister pack 11 just cut.

Then the arm 21 are rotated in the direction K until the suction cups reach the second position P2.

Upstream from this position the longitudinal edges 11b of the blister pack 11 strike the mobile parts 42 of the sidepieces 40 which are rotate on the outside against the spring fittings 44 they are connected to, thus facilitating snap insertion of the edges 11b into the slots 45.

This way the blister pack 11 is centered in respect of the longitudinal axis of the conveyor 15 and placed in the bucket 17.

The centering is optimized by the action of the slots 45, of the sidepieces 40, and is subsequently maintained by the action of the grooves 36 of the sidepieces 35, which are consecutive to and aligned with the slots 45.

This means that the smooth surface 11a of the blister pack that has just been transferred, is in touch with the bottom of the bucket 17, where it has finally come to rest as a result of the suction cups being disenabled.

The conveyor 15 is advanced by one step and the arm 21 is then rotated in the direction H, so that the suction cups return once more to the first position P1 and a new cycle of blister pack transfer may now commence in exactly the same way as the one that has just been described.

The blister pack 11 placed in the bucket 17 is with the blisters turned upwards, and this has several advantages.

It is possible for the blister packs to be inspected while still on the conveyor and, what is more, the smooth surfaces 11a of the blister packs are resting on the bottom of the buckets 17, thus facilitating rejection of any faulty blister packs from the conveyor, if necessary.

The device proposed enables optimal positioning of the blister packs 11 in their buckets; and these positions can be maintained while the conveyor is being advanced by intermittent motion, since they are assisted by the contact between the two smooth surfaces, i.e. the smooth surface 11a of the blister packs and the smooth support surface of the bucket 17.

The fact that the blister packs are in their buckets 17, with the blisters turned upwards facilitates stacking of the blister packs (for instance the faulty blister packs) which is carried out at a station 120.

The first device 110 places the blister packs 11 in the relative seats of the conveyor 15 in the best way for they to be handled, that is to say with the flat surface resting on the conveyor 15.

In this case the cutting station has been considered to be inclined as is shown in the drawings enclosed.

It can also be possible for this station to be advanced from the vertical to the horizontal; provided that the pivoting angle of the arm 21 is varied accordingly.

Similar considerations would have to be made in cases where the upper surface 14 of the conveyor belt 15 is not horizontal.

Neither does the variation with the distance between the cutting station 9 and the first part of the upper surface 14 of the conveyor belt 15 provoke any particular difficulties, since the pieces 23a and 23b can be replaced with ones of appropriate length and the shaft 22 can be positioned accordingly.

With any variations in the size of the blister packs it is be sufficient to ensure that a suitable amount of suction cups is used to optimize the pickup of the blister pack and its insertion into the bucket 17.

Obviously any variation in size means that the cutting parts of the station 9 have to be changed, and the length of the bucket 17 has to be varied accordingly (for example by adjusting the two belts forming the conveyor); this is not shown in detail, however, since it is not of relevance to this invention.

The first device transfers the blister packs from the cutting station 9 to the conveyor 15, with the blisters turned upwards, the advantages of this having been mentioned previously.

As has been shown, the first device 110 works regardless of what shape and/or which direction the cutting station 9 and upper surface 14 of the conveyor 15 are facing in, and with any kind of format whatsoever, which means it is universal.

Neither are any modifications either to the packaging line 1 or to the conveyor 15, necessary for this device to work, since it only depends on these parts for its motion, this being a further technical advantage of the design suggested.

The step-operation of the conveyor 15 determines for each seat 17, along the upper surface 14, a series of dwell stations.

In correspondence with one of these stations, marked with 225 in the drawings, there is the second device 130.

Figure 8:
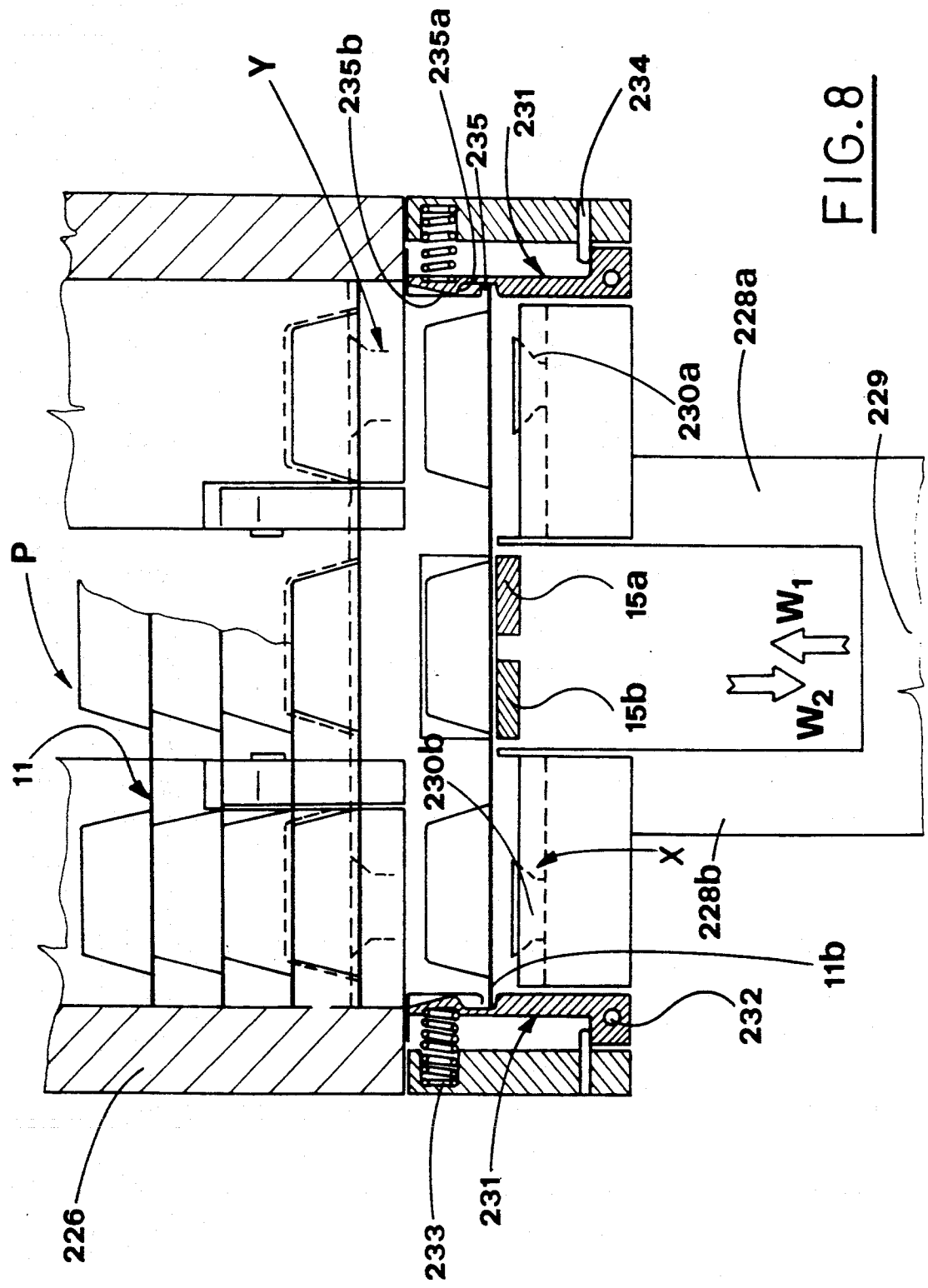
FIG. 8 is an enlarged cross section of FIG. 2a, along the line VIII—VIII.
Figure 9:
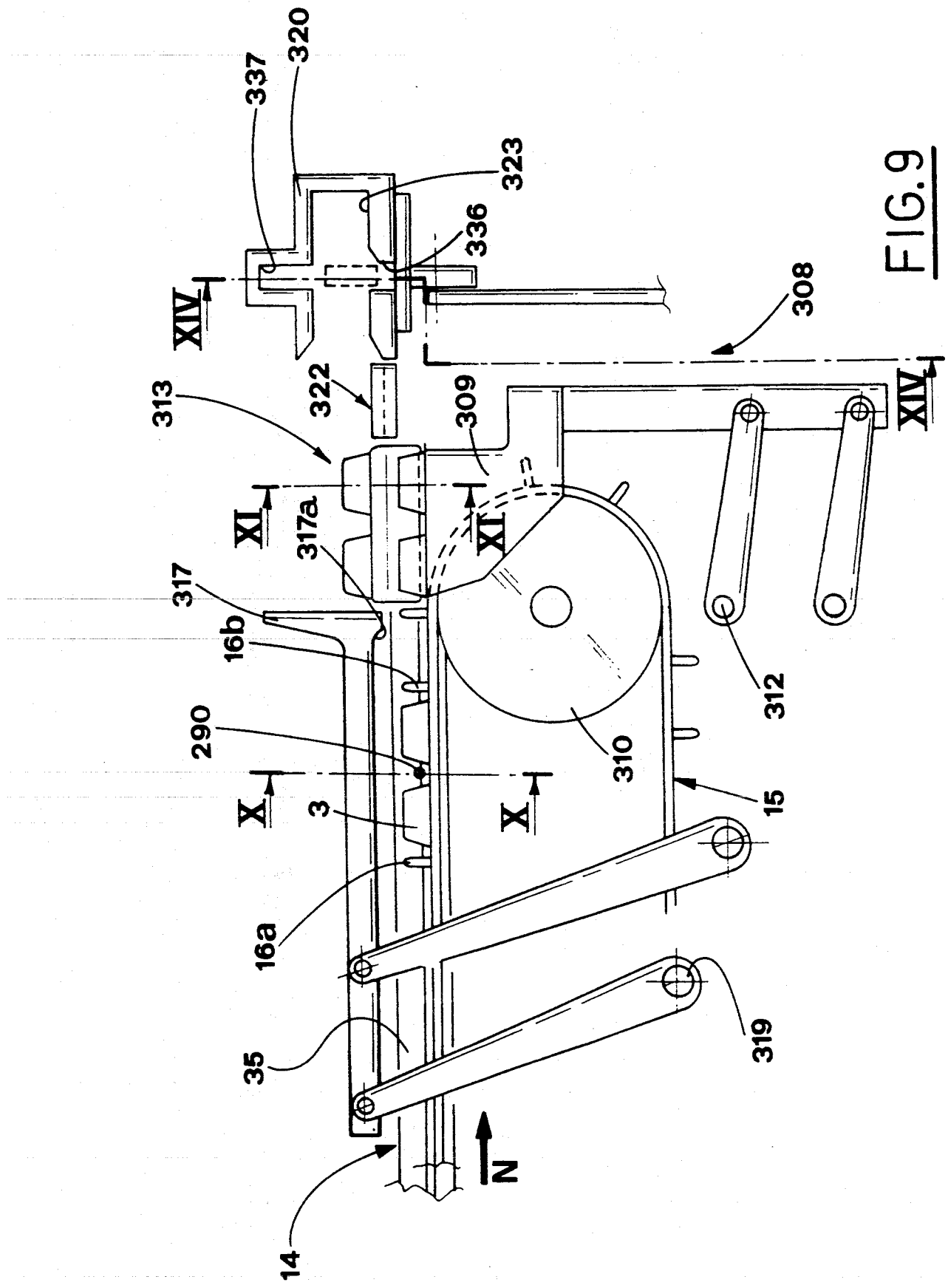
FIG. 9 is an enlarged side view of a particular of FIG. 2a marked as 140.

The device 130 consists of a vertical magazine 226 (supported, in a known manner, by the structure of the apparatus 100), open below, with a rectangular cross-section no smaller than the plan section of the blister packs 11, placed above the upper surface 14 centrally with respect to the dwell station 225 (FIG. 8).

The lower part of the magazine is provided with spring-operated retaining means 227 designed to support a stack P of blister packs 11 contained within the same magazine.

At each side of the upper surface 14 there is an arm; these arms 228a, 228b are attached to a vertical rod 229 which moves vertically, in the directions W1, W2 in a synchronised manner with the stepping movement of the conveyor 15; this movement takes place only when the conditions illustrated below are satisfied.

The arms 228a, 228b have respective suction cups 230a, 230b (the number of which depends on the size of the blister packs) which can be connected to a vacuum unit, not shown; these suction cups have a vertical axis and face upwards.

At the dwell station 225 the function of guide for the fixed sidepieces 35 is performed by a pair of movable sidepieces 231 situated downstream of the latter.

Each movable sidepieces 231 is hinged below to a fixed support, not shown, by means of a pin 232 which is parallel to the said upper surface 14; in this manner the same sidepiece is enabled to move.

More precisely, movement in an outwards direction is opposed by a spring 233, while the extent of movement inwards is restricted by means of a pin 234 which, at rest, enables the movable sidepiece 231 to align with the corresponding fixed sidepiece 35 (rest position of the movable sidepiece 231).

The upper inside-facing part of each side has a longitudinal groove 235 (FIG. 8), which in the said rest position is aligned with the groove 36 of the corresponding fixed sidepiece 35; this groove is delimited above by a rounded edge 235a which joins above with a sloped, outwards-facing surface 235b (FIG. 8).

The said arms 228a, 228b are, at their longitudinal internal edges, flush with corresponding forks 237; the tooth-like projections 237a of each fork face upwards and form a guide complementary to the longitudinal section of the blister pack 11 and also symmetrical with respect to the transverse symmetry axis of the dwell station 225.

As stated previously, the rod 229 moves vertically in the directions W1 (rising) and W2 (descending).

This movement defines two extreme characteristic positions for the suction cups 230a, 230b, lowered X and raised Y.

In the lowered position X the suction cups are below the corresponding longitudinal planes occupied by portions 11a, 11b of the blister packs 11.

In the raised position Y the suction cups are slightly higher than the horizontal plane of support of the said stack P determined by retaining means 227.

From the above description it is clear how the second device 130 operates.

Defective blister packs are rejected upstream of the device; this can be effected, for example, at a dwell station (without fixed sidepieces 35) by subjecting the defective blister pack to a lateral force to eject the blister pack from its seat 17 (arrow C in FIG. 1), and thus from the conveyor 15.

To optimise performance of the third device 140, described in the following, the rejected blister packs must be replaced with a non-defective blister packs; this is done in the following manner.

Synchronously with the positioning of the vacant seat 17 at the dwell station 225, the suction cups 230a, 230b assume the raised position Y; activation of these suction cups, and descent (towards W2) of the rod 229, cause the retaining means 227 to release the blister pack 11 at the bottom of the stack P, and the same blister pack to be transferred into the said vacant seat 17 already positioned at the dwell station 225.

The presence of the forks 237 ensures that the blister pack thus collected is optimally centered with respect to the seat 17 below.

During this transfer, the longitudinal edges 11b of the blister pack intercept the sloping surfaces 235b of the movable sidepieces 231, making these move outwards, until, on account of the reaction of the spring 233, they click into the longitudinal grooves 235.

Descent of the rod 229 then causes insertion of the blister pack 11 collected from the magazine 226 into the vacant seat 17 situated at the dwell station 225; the suction cups are deactivated synchronously with the clicking of the blister pack's longitudinal edges 11b into the grooves 235, and so the blister pack, perfectly centered, occupies the said seat 17.

In this manner a defective blister pack, rejected from the seat 17 upstream of station 120, has been replaced by a blister pack taken from the magazine.

The quantity of blister packs in the magazine 226 must never fall below a preset limit; if it does (this can be detected using suitable sensors, not shown here), the magazine must be fed with non-defective blister packs.

This is synchronised to coincide with a momentary interruption during which the ready-making line 200 does not pick up at least one carton 202.

At the same time that a seat 17 containing a blister pack is positioned in the dwell station 225, the rod 229 is forced to move upwards according to direction W1.

This causes the forks 237 to meet with the blister pack, and the suction cups 230a, 230b to intercept the lower surface of the blister pack. Since these suction cups are activated, it follows that the blister pack is collected vertically from the seat 17 (perfectly centered with respect to the magazine above owing to the action of the forks 237) and without hindrance from the movable sidepieces 231 since the interference of the longitudinal edges of the blister pack, rising, against the rounded edges 235a of the grooves 235 causes a temporary, outward movement of the same movable sidepieces 231.

As the rod 229 progresses upwards it causes the edges of the blister pack to intercept the spring-operated retaining means 227, thus raising the stack P contained in the magazine.

The moment the suction cups (in the raised position Y) are deactivated, the above blister pack becomes the base of the stack P and it rests on the horizontal supporting plane provided by the retaining means 227.

In sum, the second device 130 performs a double function, in that it feeds the vacant seats 17 (which previously contained defective blister packs, ejected upstream of the device itself) with non-defective blister packs collected from the magazine, and when necessary it automatically feeds the same magazine 226, taking non-defective blister packs from the seats 17 of the upper surface 14 of the conveyor 15.

Automatic feeding of the magazine is effected whenever the number of blister packs contained therein falls below a preset minimum, and is interrupted as soon as this number reaches a preset maximum number.

The third device 140 includes a lift, indicated in the drawings by 308.

This lift 308 has a pair of blocks 309 situated externally with respect to the wheels 310, onto which the belts 15a, 15b are wound, in the outfeed area of the conveyor 15.

Between these belts and on the upper surface 14 there is a spacer 270 which prevents the two belts from overlapping.

Two guides 280 are situated at both sides of the belts in respect of which they protrude upwardly (FIG. 11).

The guides 280 extend with their upper ends 280a over the wheels 310.

The function of the upper ends of the guides 80 is to receive and support the blister packs 11 arriving from the end part of the upper surface 14.

The blocks 309 are actuated in a vertical direction by oscillating arms 311, which pivot on pins 312 so as to form a jointed quadrilateral.

The blocks 309 of the lift 308 rise the blister pack 11, supported by the ends 280a of the guides 280, in an upwards direction, inserting it into a magazine 313 of the third device 140.

The magazine 313 consists of a pair of sides 314, placed lengthwise to the sidepieces 35 ᴜ. the conveyor 15; mobile supports 315 designed to support the stack (here designated by 50) of blister packs are fixed to the base of the magazine 313, so as to correspond with the edges of the lower surface of the blister packs 11.

Above the conveyor 15 there is a movable pushing organ 317 designed to move the stack 50 of blister packs formed in the magazine 313. The pusher 317 is actuated in a lengthwise direction with respect to the conveyor 15, by oscillating arms 318, which pivot on pins 319 so as to form a jointed quadrilateral.

In front of the magazine 313, there is a drawer 320 designed to receive the stack 50 of blister packs; the drawer 320 has a chamfered infeed opening 321, facing in the direction of the magazine 313. Between the magazine 313 and the drawer 320 there is a surface 322 where the stack 50 slides, having grooves 322a in which corresponding teeth 317a of the pusher 317 move freely.

The drawer 320 constitutes a container 323 open at the ends which are transverse to the direction of insertion of the stack 50.

In particular, the container 323 has an outfeed opening 324 for the stack 50, where the drawer 320 is shaped like a beak 325 (see FIGS. 14a, 14b).

The drawer 320 moves in a vertically transverse plane to the conveyor 15 so that the outfeed opening 324 docks with a corresponding opening 202a of a carton 202 for blister packs located at the station 203.

At this stage, the beak 325 of the drawer 320 intercepts an instruction leaflet 51, which is to be inserted into the carton 202 together with the blister pack stack 50; the leaflet 51 is located in front of the opening 202a of the carton 202, in contact with striker means 328 for folding, which act in conjunction with the same drawer 320.

The drawer 320 is actuated by a jointed quadrilateral formed by oscillating arms 329, which pivot on pins 330.

The arms 329 are attached by pins 331, to a plate 332 fixed to the lower part of the drawer 320.

There is an ejector 333 which acts in conjunction with the drawer 320 and which moves in the same vertical plane as the same drawer 320.

The ejector 333 is actuated, synchronously with the drawer 320, by oscillating arms 334, which pivot on pins 335 so as to form a jointed quadrilateral.

The ejector 333 enters into the container 323 of the drawer 320, from the side opposite to the outfeed opening 324; to enable the ejector 333 to pass, the draw 320 has a slot 336 below and features an upper channel 337.

Operation of the third device 140 is subordinated to the consent of means 290 situated upstream of the magazine 313, which check that the blister pack is present.

Actuation of the lift 308 raises the blister pack 11, which is inserted into the magazine 313 located above, pushing aside the mobile supports 315 which hold up the stack.

Figure 12:
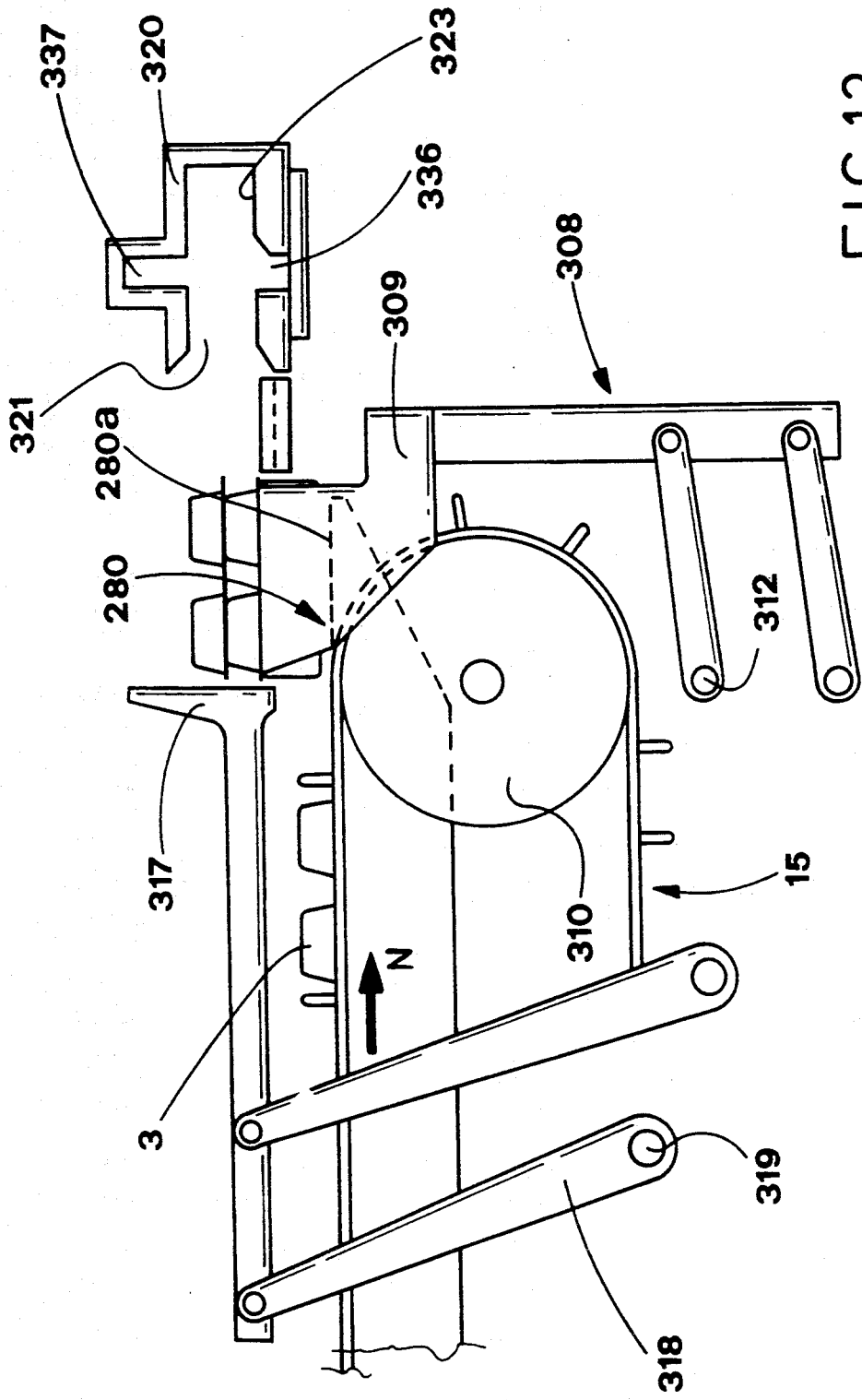
FIGS. 12 and 13 are enlarged side views of the particular of FIG. 2a marked as 140, shown in two subsequent operating stages respectively.

The blister pack 11 then rests on the mobile supports 315, forcing upwards any blister packs already present in the magazine 313 (FIG. 12). In this way a stack 50 of blister packs 11 is formed, from the bottom upwards.

Figure 13:
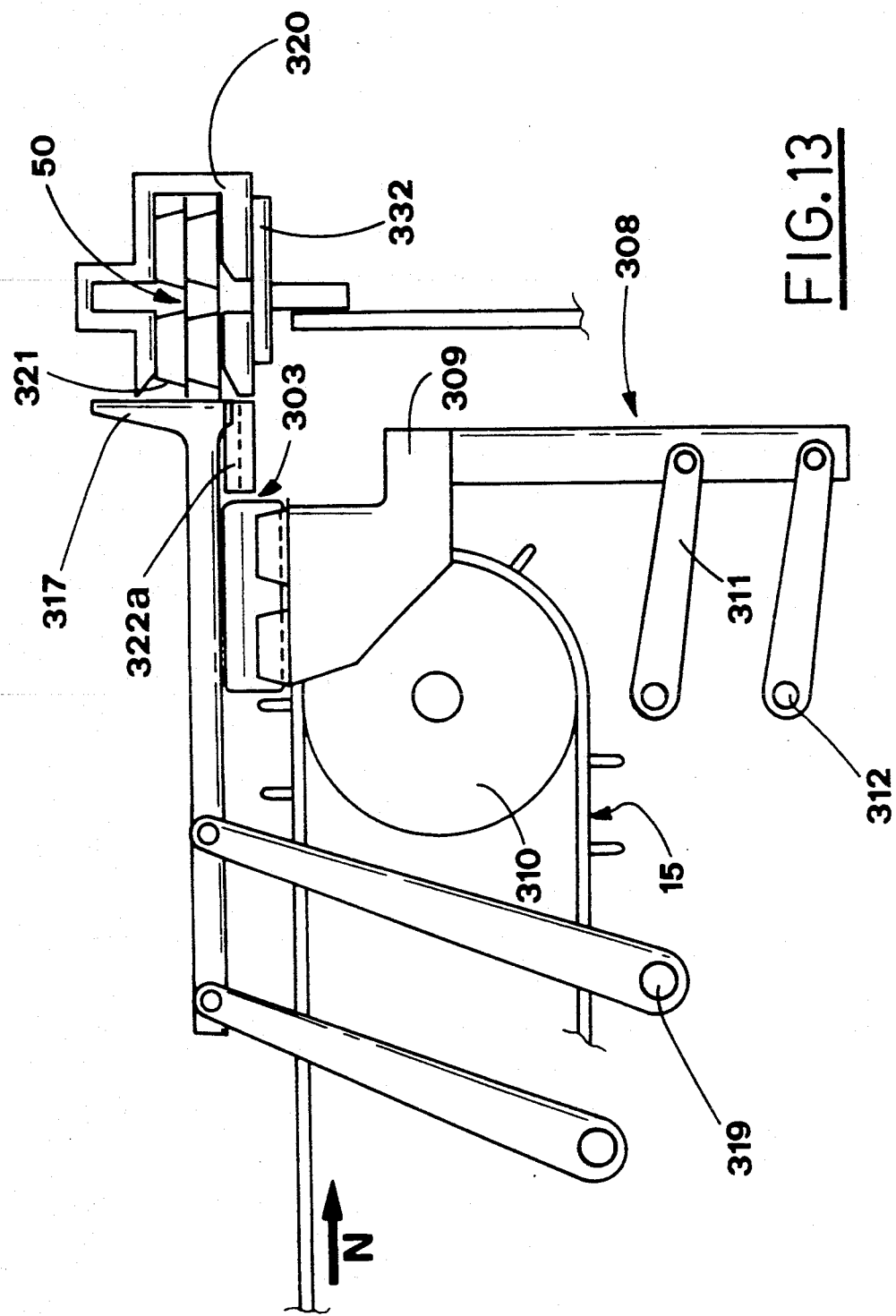

After the stack 50 has been formed with the desired number of blister packs 11, the pusher 317 is actuated and pushes the stack 50 into the drawer 320 (FIG. 13).

Then the oscillating arms 329 are actuated pushing the drawer 320 in the direction of the carton 202 to be filled. As it draws nearer to the carton 202, the beak 325 of the drawer 320 intercepts the instruction leaflet 51, folds it over the strikers 328 as is clearly visible in FIG. 14a where the dotted lines 325a, 325b indicate successive positions assumed by the beak 325 during folding of the leaflet 51; the lines 51a and 51b indicate the respective positions of the leaflet 51.

The ejector 333 is actuated synchronously with the drawer 320, following, during the first stage of its travel, the movement of the same drawer; when the drawer 320 stops, the ejector 333 continues its travel entering into the same drawer thus causing the stack 50 of blister packs 11 to be pushed out of the opening 324, as shown in FIG. 14b where the dotted lines 333a, 333b and 333c indicate successive positions assumed by the ejector; the lines 329a and 334a indicate the initial positions of the oscillating arms 329, 334.

The stack 50 of blister packs 11 during entry into the carton 202 pushes the instruction leaflet 51, and completes folding inside the same carton 202.

In the case shown, the stack 50 inserted into the carton 202 consists of two blister packs 11; it must be noted however that one single blister pack 11 can be inserted into the carton 202.

The folding of the instruction leaflet 51 effected by the beak 325 of the drawer 320 guarantees in any case that the blister packs 11 are correctly inserted into the carton 202.

The apparatus 100 here proposed is independent, as for working, of the blister packaging line 1 and of the carton ready-making line 200; the apparatus proposed is operatively interconnected with the blister packaging line and with the carton ready-making line only as far as its motion is concerned.

This is another advantage to be added to the already stated ones.

This allows the apparatus 100 to be connected to any kind of blister pack packaging lines, working with any kind of products (for example the line shown in FIGS. 1 and 2).

Moreover the apparatus 100 can be connected to any kind of carton ready-making lines or machines, as shown in FIGS. 1 and 3, for example.

The invention, as described above is only an example, and can be subject to numerous modifications and variations, all of which enter within the terms of the invention. All the details of this invention can be substituted by their technical equivalents.

What is claimed is:

1. An apparatus for receiving blister packs from a product packaging line, and for inserting said blister packs into cartons coming from a carton ready-making line operating to obtain cartons from flat blanks or from flat tubular blanks, said apparatus comprising:

a conveyor made as a closed loop and located downstream of a cutting station where said blister packs are formed in said packaging line, said conveyor being connected with its terminal part to said carton ready-making line for obtaining said cartons and featuring an upper surface fitted with crosspieces forming seats therebetween designed to receive blister packs oriented transversely in respect of said conveyor;

guiding means located at both sides of said conveyor and designed to engage longitudinal edges of said blister packs placed in said seats so that said edges can slide along said guiding means and that said blister packs are centered in respect of said upper surface;

a first device located and operating between said cutting station and the beginning of said upper surface, said device being operated in phase correlation with the operation of said cutting station, and with the motion of said conveyor, so to transfer said blister packs from said cutting station to relative receiving seats of said upper surface which are passing step by step at said beginning of said conveyor, with said blister packs resulting placed into said seats with the blisters turned upwards and with the related longitudinal edges engaging said guiding means;

an ejecting station for ejecting faulty blister packs out from the related seats, said ejecting station being located downstream of said first device;

a second device, positioned downstream of said ejecting station, said second device operating in phase correlation with the motion of said conveyor and being designed to fill empty seats of said upper surface with non-defective blister packs, when said faulty blister packs are removed from said seats, said second device being also able to feed itself, in occasion of a stop of said carton ready-making line in forming at least one carton, with said non-defective blister packs taken from said seats of said upper surface;

a third device, positioned downstream of said second device near the terminal part of said upper surface, said third device being operated, in phase correlation with the motion of said conveyor and of said carton ready-making line, so as to form stacks of non-defective blister packs, to fold an information leaflet, to move a stack, together with a folded leaflet, perpendicularly in respect of said upper surface, to insert said stack and leaflet into a carton positioned on said carton ready-making line.

2. An apparatus according to claim 1, wherein said first device includes:

at least one arm, having one end pivoted on and supported by a shaft, said shaft being positioned transversal in respect of said upper surface;

gripping means fastened to a remaining end of said arm;

said arm being made to oscillate in phase correlation with the operation of said cutting station so that said gripping means are moved between two extreme positions, namely a first position, in which said gripping means are located in said cutting station, resting on the smooth surface of a blister pack being cut from said blister strip, so that said blister pack is then picked up when said gripping means are actuated, and second position in which said gripping means are located at an initial part of said upper surface, so that said smooth surface of said blister pack touches and rests on said upper surface, with the blisters turned upwards, as a result of said gripping means being disenabled.

3. An apparatus according to claim 2, wherein said first device includes:

two first fixed longitudinal sidepieces, connected to said upper surface and protruding downstream of said initial part of said upper surface, said fixed sidepieces bearing longitudinal grooves designed to receive and guide longitudinal edges of said blister packs resting on said upper surface;

second sidepieces, located upstream of said fixed sidepieces and featuring longitudinal slots respectively aligned to said grooves, said second sidepieces being shaped in such a way as to receive said longitudinal edges of said blister packs by snap insertion into said slots, when said gripping means are in said second position, with subsequent centering of the blister pack in relation to the longitudinal axis of said upper surface.

4. An apparatus according to claim 3, wherein each of said second sidepieces consists of a fixed lower part and an upper mobile part, said upper mobile part oscillating about a further shaft, parallel to the direction of travel of said upper surface, with spring fittings acting on said upper mobile part;

said fixed part and mobile part jointly forming a corresponding longitudinal slot.

5. An apparatus according to claim 2, wherein said arm, pivoting about said shaft, consists of two pieces operating in working spaces located at either side of said upper surface.

6. An apparatus according to claim 5, wherein said shaft is positioned between said cutting station and an initial part of said upper surface.

7. An apparatus according to claim 3, wherein said gripping means comprise suction cups vacuum operated.

8. An apparatus according to claim 1, wherein said second device comprises:

a vertical magazine, open below, whose rectangular cross-section is no smaller than the plan section of the blister packs, placed above the upper surface in a centered position with respect to a dwell station of the said seats, determined by the step-motor drive of the said conveyor, with the lower part of the said magazine provided with spring-operated means for retaining a stack of blister packs within the same magazine; at least two arms attached to a vertical rod and situated one on each side of the said upper surface, below said magazine, having on their upper surface gripping means, with said rod moving vertically and synchronously with the stepping movement of the said conveyor, thus forming two extreme and characteristic positions for the said gripping means, a lowered position, in which such means are below the longitudinal planes occupied by the portions of the said blister pack protruding from the corresponding above-mentioned seats, and a raised position, in which the same means are situated at least at the level of the horizontal supporting plane provided by the said retaining means of the said stack, activation of the said gripping means during their upward movement, syncronously with their meeting with the above placed portions of a blister pack which are protruding from the seat situated in the said dwell station, and the deactivation of the same means in the said raised position, causing the blister pack to be transferred from the said seat to the magazine and to become the lowermost blister pack of the stack;

activation of the said gripping means, in the raised position causing the said gripping means to release the lowermost blister pack of the stack in the magazine, with the consequent transfer of the latter blister pack to a vacant seat below on said conveyor situated at the said dwell station, on which seat the same blister pack remains since the above-mentioned gripping means are deactivated.

9. An apparatus according to claim 8, wherein flush to the internal longitudinal edges of the said arms there are corresponding forks, the upwards-facing tooth-like projections of each of which form a guide complementary to the longitudinal section of the said blister pack, and symmetrical with respect to the transverse axis of symmetry of the said dwell station.

10. An apparatus according to claim 8, wherein upstream of the said dwell station there are two longitudinal fixed sidepieces situated symmetrically with respect to the longitudinal symmetry axis of the said upper surface, each of which on the inside face has a longitudinal groove and these grooves receive and guide the edges of the said blister packs, in the said dwell station, beneath said magazine, being located two third movable sidepieces placed downstream of the corresponding fixed sidepieces each having on the inside a longitudinal groove, with each third movable sidepiece joined to a fixed support by means of a pin parallel to the said upper surface, and subject to spring-operated means which oppose movement in a outwards direction, and means for blocking movement in an inwards direction, with said latter means in conjunction with the said spring-operated means, forming a rest position for the relative movable sidepiece, in which the groove in the latter is aligned with the groove of the corresponding fixed sidepiece.

11. An apparatus according to claim 10, wherein each of the said grooves is limited above by a rounded edge which above joins a sloping, outwards-oriented surface.

12. An apparatus according to claim 8, wherein the said gripping means consist of suction cups.

13. An apparatus according to claim 1, wherein said third device comprises:

a pair of guides, located at station for forming a stack of blister packs, said station being located at the terminal part of said upper surface, with said pair of guides designed to receive resting upon them the blister packs coming along said upper surface;

a lift that at said station inserts the blister pack stack supported by the said guides, moving it upwards, into a magazine;

a pusher which moves the stack of blister packs formed in said magazine;

a drawer designed to receive said stack of blister packs and having an outfeed opening shaped like a beak, said drawer being movable and intercepting with said beak-shaped opening an instruction leaflet located in front of a corresponding opening of a carton for said blister pack stack;

striker means for folding, in conjunction with the said drawer, said instruction leaflet;

an ejector actuated synchronously with said drawer to insert said stack of blister packs, together with the instruction leaflet, into said carton.

14. An apparatus according to claim 13, wherein said drawer is provided with an infeed opening, facing in the direction of said magazine, said drawer forming a container open at the ends resulting transverse to the direction of insertion of said stack, with said outfeed opening for the stack being made at one of the said ends.

15. An apparatus according to claim 13, said drawer moves on a plane which is vertically transverse to said conveyor and is actuated by oscillating arms which pivot so as to form a jointed quadrilateral.

16. An apparatus according to claim 13, wherein said ejector is actuated, so as to move on the same vertical plane as said drawer, by oscillating arms pivoting so as to form a jointed quadrilateral;

said ejector being able to enter into a container formed by said drawer, from the opposite side of said outfeed opening.

17. An apparatus according to claim 13, wherein said lift has a pair of blocks located externally in respect of said conveyor, at the outfeed part of said upper surface, said lift being actuated in a vertical direction by oscillating arms, which pivot so as to form a jointed quadrilateral.

18. An apparatus according to claim 13, wherein said magazine is formed by a pair of sides, positioned lengthwise with respect to said conveyor, and there are, fixed to the base of the magazine and according to the dimensions of the underside of blister packs mobile supports designed to support the stack of blister packs.

19. An apparatus according to claim 1, wherein said conveyor has a pair of belts arranged side by side and moved with an intermittent motion between said guiding means, said belts featuring adjustable crosspieces forming said seats with said blister packs held during movement between in said seats.

20. An apparatus according to claim 19, wherein said belts can be moved one in respect of the other, in such a way to form seats between them, which can be continuously varied in the longitudinal direction according to the size of the blister packs.

21. An apparatus according to claim 1, wherein said guiding means are interrupted in correspondance with said ejecting station for ejecting faulty blister packs from said upper surface, said faulty blister packs being ejected through the interrupted part of said guiding means.

22. An apparatus according to claim 13, wherein said guides extend upstream coming almost into contact with the longitudinal external edges of the relative belts at the level of the upper surface of said conveyor.

23. An apparatus according to claim 22, wherein between said belts, at least at the level of said upper surface, there is a spacer designed to prevent the same belts from overlapping.

24. An apparatus according to claim 13, wherein said lift, said pusher, said drawer and said ejector are controlled by means located upstream of said stack forming station, said means being designed to check the presence of said blister pack stack.

* * * * *